United States Patent
Yu et al.

(10) Patent No.: US 11,409,582 B2
(45) Date of Patent: Aug. 9, 2022

(54) CLIPBOARD CONTROL METHOD AND SYSTEM BASED ON MOBILE TERMINAL

(71) Applicant: JRD COMMUNICATION (SHENZHEN) LTD, Guangdong (CN)

(72) Inventors: Bin Yu, Guangdong (CN); Weiqin Yang, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 894 days.

(21) Appl. No.: 16/313,898

(22) PCT Filed: Jul. 24, 2017

(86) PCT No.: PCT/CN2017/094120
§ 371 (c)(1),
(2) Date: Dec. 28, 2018

(87) PCT Pub. No.: WO2018/036329
PCT Pub. Date: Mar. 1, 2018

(65) Prior Publication Data
US 2021/0232448 A1     Jul. 29, 2021

(30) Foreign Application Priority Data
Aug. 23, 2016  (CN) .......................... 201610706251.0

(51) Int. Cl.
*G06F 9/54* (2006.01)
*G06F 7/24* (2006.01)
(52) U.S. Cl.
CPC ................ *G06F 9/543* (2013.01); *G06F 7/24* (2013.01); *G06F 2207/226* (2013.01)

(58) Field of Classification Search
CPC ...... G06F 9/543; G06F 7/24; G06F 2207/226; G06F 3/0482; G06F 9/44
See application file for complete search history.

(56) References Cited

U.S. PATENT DOCUMENTS

| 2012/0246594 A1* | 9/2012 | Han ...................... G06F 40/166 715/781 |
| 2015/0026549 A1 | 1/2015 | Shao |

(Continued)

FOREIGN PATENT DOCUMENTS

| CN | 103617154 A | 3/2014 |
| CN | 104657038 A | 5/2015 |
| CN | 104657341 A | 5/2015 |

*Primary Examiner* — Jennifer N Welch
*Assistant Examiner* — Amy P Hoang

(57) ABSTRACT

The present disclosure provides a clipboard control method and system based on a mobile terminal. The method includes: setting a clipboard, including setting an allowable number of copy content items in the clipboard and a survival time corresponding to each copy content in the clipboard, and setting the clipboard to be able to save multiple pieces of copy contents at the same time; receiving an operation instruction from a user to copy the multiple pieces of contents, processing the copy contents in the clipboard, and saving the multiple pieces of the copy contents in the clipboard when the multiple pieces of contents need to be copied; and, receiving an operation instruction from the user to select a paste function when needing to paste, displaying the multiple pieces of the copy contents sequentially according to the selected pasting function, selecting and pasting a specified content as needed.

12 Claims, 1 Drawing Sheet

Setting a clipboard, comprising setting an allowable number of copy content items in the clipboard and a survival time corresponding to each copy content in the clipboard, and setting the clipboard to be able to save multiple pieces of copy contents at the same time — S100

Receiving an operation instruction from a user to copy the multiple pieces of contents, processing the copy contents in the clipboard, and saving the multiple pieces of the copy contents in the clipboard when the multiple pieces of contents need to be copied — S200

Receiving an operation instruction from the user to select a paste function when needing to paste, displaying the multiple pieces of the copy contents sequentially according to the selected pasting function, selecting and pasting a specified content as needed — S300

(56) References Cited

U.S. PATENT DOCUMENTS

2016/0154686 A1\* 6/2016 Huang .................. G06F 3/0488
  715/780
2018/0039385 A1\* 2/2018 Worley .................. G06F 9/543

\* cited by examiner

CLIPBOARD CONTROL METHOD AND SYSTEM BASED ON MOBILE TERMINAL

CROSS-REFERENCE TO RELATED APPLICATIONS

The present application is a 35 U.S.C. § 371 National Phase conversion of International (PCT) Patent Application No. PCT/CN2017/094120 filed Jul. 24, 2017, which claims foreign priority of Chinese Patent Application No. 201610706251.0, filed on Aug. 23, 2016 in the State Intellectual Property Office of China, the contents of all of which are hereby incorporated by reference.

TECHNICAL FIELD

The present application relates to a technology field of mobile terminal, and in particular to a clipboard control method and a clipboard control system based on a mobile terminal.

BACKGROUND

With the widespread use of mobile terminals, various applications originally used on computers are gradually used widely in mobile terminals, such as Taobao online shop, email, and the likes. These applications tend to edit more texts. On the computer, text editing can be quickly performed by various keyboard/mouse operations; while on the mobile terminal, the operation is limited by its size, and hence various operations are inconvenient. For example, the user needs to copy the information of ten contacts to an email and send it out. This operation of copying multiple info of text one by one to an email can be operated directly on the computer by opening multiple windows to copy the multiple files, which is more convenient to operate. However, on the mobile terminal, it is necessary to copy the first information of text, paste it into the email, and then copy the second information of text and paste it into the email. The operation should go back and forth between the various interfaces, which is very troublesome.

Therefore, the prior art has yet to be improved and developed.

SUMMARY

The technical problem to be solved by the present application is to provide a clipboard control method and a clipboard control system based on a mobile terminal for the above-mentioned drawbacks of the prior art. The aim is to save multiple pieces of copy contents in the clipboard, therefore it is not necessary to switch back and forth between several interfaces when continuously copying multiple pieces of contents, which is convenient for the user to use, improves the operation efficiency and provides convenience for the user.

Technical solutions for solving the above-mentioned technical problem are as follows.

A clipboard control method based on a mobile terminal, including: (A) setting a clipboard, including: setting an allowable maximum number of copy content items of the clipboard and a clearing time, the clearing time being a survival time of one item of copy content in the clipboard; and setting the clipboard to be able to save multiple pieces of copy contents at the same time; (B) receiving an operation instruction from a user to copy the multiple pieces of copy contents, processing the copy contents in the clipboard, and saving the multiple pieces of the copy contents in the clipboard when the multiple pieces of contents need to be copied; and (C) receiving an operation instruction from the user to select a paste function when needing to paste, displaying all the copy content items in the clipboard based on creating time of the items according to the selected paste function, selecting and pasting a specified content as needed.

In the clipboard control method based on a mobile terminal, the block (B) includes: (B1) when a user copy operation is detected, deleting an earliest saved copy content item when the copy content items existed in the clipboard reach the maximum number of the copy content items, and creating a copy content item in the clipboard for the copy operation; wherein the copy content item includes a creating time of the item, and an item content; the creating time of the item is the time when the item is created; and the item content is the content copied from the copy operation.

In the clipboard control method based on a mobile terminal, the block (B) includes: when a storing time of a copy content item in the clipboard exceeds the clearing time, deleting the copy content item.

In the clipboard control method based on a mobile terminal, wherein in the block (B) processing the copy contents in the clipboard includes: (B31) when the clipboard is empty and when a copy content item is created, obtaining the creating time of the copy content item, and setting a timeout time for a timer to be a clearing time, and then starting the timer; (B32) when the earliest saved copy content item in the clipboard is deleted, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer; and (B33) when the timer expires, deleting the earliest saved copy content item in the clipboard, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer.

A clipboard control method based on a mobile terminal, including: (A) setting a clipboard, including setting an allowable number of copy content items in the clipboard and a survival time corresponding to each copy content in the clipboard, and setting the clipboard to be able to save multiple pieces of copy contents at the same time; (B) receiving an operation instruction from a user to copy the multiple pieces of contents, processing the copy contents in the clipboard, and saving the multiple pieces of the copy contents in the clipboard when the multiple pieces of contents need to be copied; and (C) receiving an operation instruction from the user to select a paste function when needing to paste, displaying the multiple pieces of the copy contents sequentially according to the selected pasting function, selecting and pasting a specified content as needed.

In the clipboard control method based on a mobile terminal, wherein the block (A) further includes: (A10) setting the clipboard; the setting of the clipboard including setting a maximum number of the copy content items and clearing time, wherein the number of the copy content items is an upper limit of the items of copy contents in the clipboard; the clearing time is a survival time of one copy content item in the clipboard.

In the clipboard control method based on a mobile terminal, wherein the block (B) includes: when a storing time of a copy content item in the clipboard exceeds the clearing time, deleting the copy content item.

In the clipboard control method based on a mobile terminal, wherein the block (B) includes: (B1) when the user copy operation is detected, deleting an earliest saved copy content item when the copy content items existed in the clipboard reach a maximum number of the copy content items, and creating a copy content item in the clipboard for the copy operation; wherein the copy content item includes a creating time of the item, and an item content; the creating time of the item is the time when the item is created; and the item content is the content copied from the copy operation.

In the clipboard control method based on a mobile terminal, wherein in the block (B) processing the copy contents in the clipboard includes: (B31) when the clipboard is empty and when a copy content item is created, obtaining the creating time of the copy content item, and setting a timeout time for a timer to be a clearing time, and then starting the timer; (B32) when the earliest saved copy content item in the clipboard is deleted, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer; and (B33) when the timer expires, deleting the earliest saved copy content item in the clipboard, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer.

In the clipboard control method based on a mobile terminal, wherein in the block (C) includes: (C1) when the user paste operation is detected, displaying the copy content items in the clipboard according to the creating time of the items.

A clipboard control system based on a mobile terminal, including a processor and a memory, wherein the memory is configured to store computer instructions, the processor executes the computer instructions and is configured to: set up a clipboard for setting an allowable number of copy content items of the clipboard and a survival time corresponding to each copy content in the clipboard; wherein the clipboard is set to be able to save multiple pieces of copy contents; receive an operation instruction from a user for copying the multiple pieces of the copy contents, process the copy contents in the clipboard, and save the multiple pieces of the copy contents in the clipboard when the multiple pieces of contents need to be copied; and to receive the user operation instruction for selecting a paste function when the pasting is needed, display the multiple pieces of the copy contents sequentially according to the selected paste function, and select and paste a specified content as needed.

In the clipboard control system based on a mobile terminal, wherein the setting of the clipboard includes setting a maximum number of copy content items and a clearing time, the number of the copy content items is an upper limit of the items of copy contents in the clipboard, and the clearing time is a survival time of one copy content item in the clipboard.

In the clipboard control system based on a mobile terminal, wherein the processor is further configured to: when a user copy operation is detected, delete an earliest saved copy content item when the copy content items existed in the clipboard reach a maximum number of the copy content items, and create a copy content item in the clipboard for the copy operation; wherein the copy content item includes a creating time of the item, and an item content; the creating time of the item is the time when the item is created; and the item content is the content copied from the copy operation.

In the clipboard control system based on a mobile terminal, wherein the processor is further configured to: when the clipboard is empty and when a copy content item is created, obtain the creating time of the copy content item, and set a timeout time for a timer to be a clearing time, and then start the timer; when the earliest saved copy content item in the clipboard is deleted, turn off the timer when the clipboard is empty after the deletion; or, obtain the creating time of the earliest saved copy content item in the clipboard when the clipboard is not empty after the deletion, and set the timeout time of the timer as the clearing time, and then restart the timer; and when the timer expires, delete the earliest saved copy content item in the clipboard, turn off the timer when the clipboard is empty after the deletion; or, obtain the creating time of the earliest saved copy content item in the clipboard when the clipboard is not empty after the deletion, and set the timeout time of the timer as the clearing time, and then restart the timer.

In the clipboard control system based on a mobile terminal, wherein the processor is further configured to: when the user paste operation is detected, display all the copy content items in the clipboard according to the creating time of the items.

Comparing the clipboard control method and clipboard control system based on a mobile terminal provided by the present application with the prior art, the method of the present application processes the contents of the clipboard by presetting a clipboard to control the time management of copy content items. Multiple pieces of copy contents can be saved in the clipboard. Therefore, there is no need to switch back and forth between the interfaces when continuously copying multiple pieces of contents, which is convenient for users to use, improves the operation efficiency for the user, and provides convenience for the users.

DETAILED DESCRIPTION

To make the objects, technical solutions and advantages of the present application clearer and more specific, the present application will be further described in detail below with reference to the accompanying drawings and embodiments. It should be understood that the specific embodiments herein are only used to describe the present application, rather than limit the present application.

Figure 1:
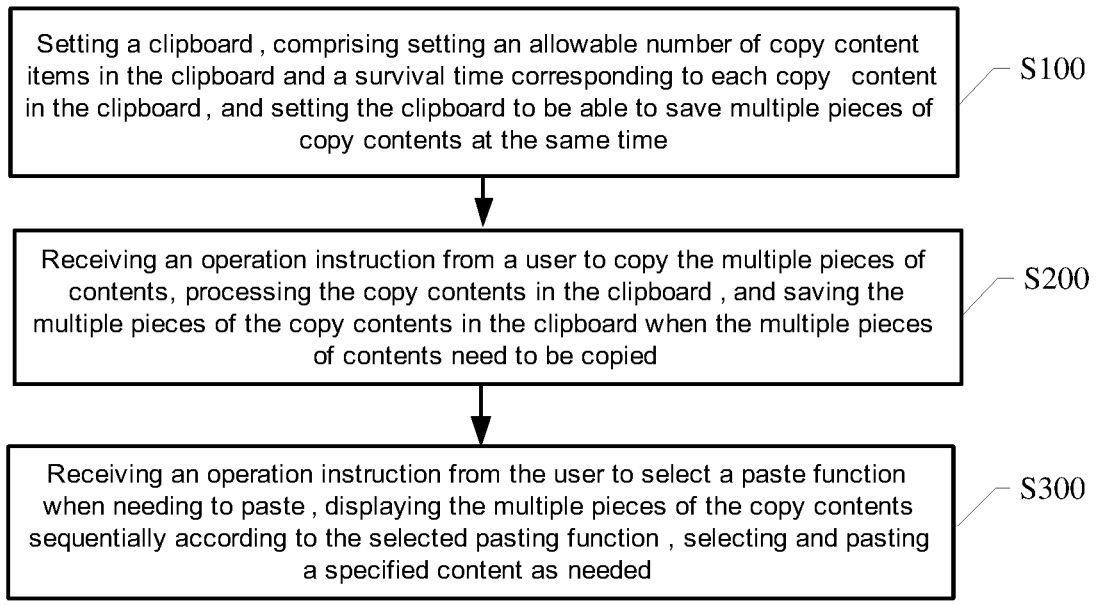
FIG. 1 is a flow chart of a first preferred embodiment of a clipboard control method based on a mobile terminal according to the present application.

Referring to FIG. 1, which is a flow chart of a first preferred embodiment of a clipboard control method based on a mobile terminal according to the present application. As shown in FIG. 1, the clipboard control method based on a mobile terminal according to the first preferred embodiment of present application includes the following blocks.

Block S100: setting a clipboard, setting an allowable number of copy content items of the clipboard and a survival time corresponding to a copy content in the clipboard. Setting the clipboard to be able to save multiple pieces of the copy contents at the same time.

In the embodiment of the present application, the clipboard is required to be set in advance. The setting of the clipboard includes: setting the number of content items that the clipboard allows to copy (i.e., setting the maximum number of copy contents), and a survival time corresponding to each copy content on the clipboard (i.e., setting a clearing time). The number of the copy content items is the upper limit of the number of the copy content items in the clipboard. For example, if the number of copy content items in the clipboard is set to 10, the maximum items of the copy contents saved in the clipboard are only 10. If a 11th item of the copy content needs to be saved, the clipboard system will automatically delete the earliest saved copy content.

The clearing time is the survival time of one item of the copy content in the clipboard, and the clearing time indicates the longest storage time of a copy content in the clipboard system, and the copy content will be automatically deleted when excess the clearing time. Of course, the clearing time can also be set to infinity. Then, as long as the number of copies in the clipboard system does not reach the upper limit, the copy contents will always exist. For example, the clipboard can be set to copy 10 individual contents at a time, the user can paste them in 10 times when used.

Block S200: receiving an operation instruction from a user to copy multiple pieces of contents, processing the copy contents in the clipboard, and saving the multiple pieces of the copy contents in the clipboard when the multiple pieces of contents need to be copied.

In the present embodiment, when a user copy operation is detected, deleting an earliest saved copy content item if the copy content items existed in the clipboard reach the maximum number of the copy content items, and creating a copy content item in the clipboard for the copy operation.

The copy content item includes: a creating time of the item and an item content. That is, the copy time and the copy content.

The creating time of the item is the time when the item being created. That is, a copy time of a single item.

The item content is the copy content of the copy operation.

For example, if the maximum number of the copy content items in the clipboard is 10, while there are 10 copy content items existed in the current clipboard, the earliest saved copy content item will be deleted, and then a new copy content item will be added. The newly added copy content item includes a creating time and an item content. The creating time of the item is the time when the item being created, the item content is the content copied for the copy operation.

Furthermore, in the present application, processing the copy content of the clipboard includes:

If a copy content item is created when the clipboard is empty, obtaining the creating time of the copy content item, and setting a timeout time for a timer as a clearing time, and then starting the timer;

When the earliest saved copy content item in the clipboard is deleted, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer;

When the timer expires, deleting the earliest saved copy content item in the clipboard, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer.

That is, in the present application, the timing control to the copy content items specifically includes the following three situations.

Situation 1: if a copy content item is created when the clipboard is empty, then obtaining the creating time of the copy content item, and setting a timeout time for a timer to be a clearing time, and then starting the timer.

Situation 2: when the earliest saved copy content item in the clipboard is deleted, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer.

Situation 3: when the timer expires, deleting the earliest saved copy content item in the clipboard, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer.

Block S300: receiving an operation instruction from the user to select a paste function when needing to paste, displaying the multiple pieces of the copy contents sequentially according to the selected paste function, selecting and pasting a specified content as needed.

When the user paste operation is detected, displaying all the copy content items in the clipboard according to the creating time of the items. For example, when there are three copy content items existed in the current clipboard as below, the first column is the creating time of the items, and the second column is the item contents:

Dec. 12, 2015 12:12:12 Hello
Dec. 12, 2015 12:12:16 ABCDEFG
Dec. 12, 2015 12:12:18 123456

The following list will be displayed for the user to select when the paste operation is detected:
Hello;
ABCDEFG;
123456.

Then, the multiple pieces of the copy contents are sequentially displayed according to the selected paste function, and the specified content is selected and pasted as needed.

Figure 2:
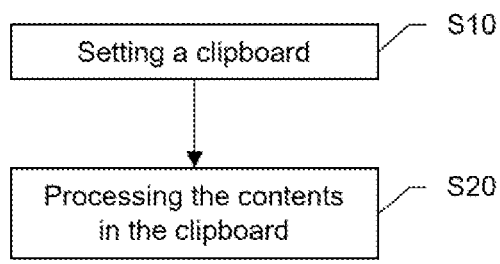
FIG. 2 is a flow chart of a second preferred embodiment of a clipboard control method based on a mobile terminal according to the present application.

Referring FIG. 2, which is a flow chart of a second preferred embodiment of a clipboard control method based on a mobile terminal according to the present application. As shown in FIG. 2, the clipboard control method based on a mobile terminal according to the second preferred embodiment of the present application includes the following blocks.

S10: setting a clipboard.

The setting of the clipboard includes: a maximum number of copy content items, and a clearing time.

The number of the copy content items is an upper limit of the items of copy contents in the clipboard.

The clearing time is a survival time of one copy content item in the clipboard.

S20: processing the contents in the clipboard.

The process specifically includes:

S21: when a user copy operation is detected, deleting an earliest saved copy content item if the copy content items existed in the clipboard reach the maximum number of the copy content items, and creating a copy content item in the clipboard for the copy operation.

The copy content item includes: a creating time of the item and an item content.

The creating time of the item is the time when the item being created.

The item content is the copy content of the copy operation.

S22: when the user paste operation is detected, displaying all the copy content items in the clipboard according to the creating time of the items.

S23, the timing arrangement to the copy content items, including:

S231, if a copy content item is created when the clipboard is empty, then obtaining the creating time of the copy content item, and setting a timeout time for a timer to be a clearing time, and then starting the timer.

S232, when the earliest saved copy content item in the clipboard is deleted, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer.

S233, when the timer expires, deleting the earliest saved copy content item in the clipboard, turning off the timer if the clipboard is empty after the deletion; or, obtaining the creating time of the earliest saved copy content item in the clipboard if the clipboard is not empty after the deletion, and setting the timeout time of the timer as the clearing time, and then restarting the timer.

The application aims to make multiple pieces of copy contents can be saved in the clipboard, so that there is no need to switch back and forth between operating interfaces when continuously copying multiple pieces of contents, which is convenient for the user to use, improves the operation efficiency, and provides convenience for the user.

Figure 3:
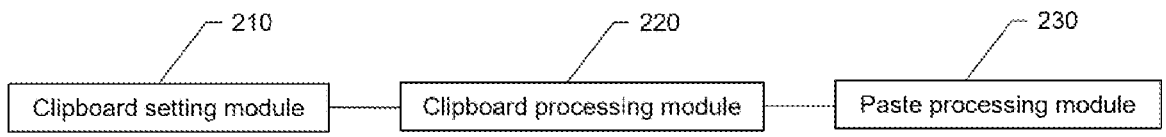
FIG. 3 is a functional block diagram of a preferred embodiment of a clipboard control system based on a mobile terminal according to the present application.

Based on the foregoing method embodiments, the present application further provides a clipboard control system based on a mobile terminal. As shown in FIG. 3, the system includes:

A clipboard setting configured to set up the clipboard for setting an allowable number of copy content items in the clipboard, and a survival time corresponding to each copy content in the clipboard. The set clipboard is set to be able to save multiple pieces of copy contents. Specifically as described above.

A clipboard processing module 220, configured to receive an operation instruction from a user for copying the multiple pieces of the copy contents, processing the copy contents in the clipboard, and saving the multiple pieces of the copy contents in the clipboard when the multiple pieces of contents need to be copied. Specifically as described above.

A paste processing module 230, configured to receive the user operation instruction for selecting a paste function when the pasting is needed, displaying the multiple pieces of the copy contents sequentially according to the selected paste function, and selecting and pasting a specified content as needed. Specifically as described above.

Further, in the clipboard control system based on a mobile terminal, the clipboard setting module includes:

A clipboard setting unit, configured to set up the clipboard. The setting of the clipboard includes: setting a maximum number of copy content items, and a clearing time. The number of the copy content items is an upper limit of the items of copy contents in the clipboard. The clearing time is a survival time of one copy content item in the clipboard. Specifically as described above.

Furthermore, in the clipboard control system based on a mobile terminal, the clipboard processing module includes:

A first clipboard processing unit, when a user copy operation is detected, deleting an earliest saved copy content item if the copy content items existed in the clipboard reach the maximum number of the copy content items, and creating a copy content item in the clipboard for the copy operation. Specifically as described above.

The copy content item includes: a creating time of the item and an item content.

The creating time of the item is the time when the item being created.

The item content is the copy content of the copy operation. Specifically as described above.

In the clipboard control system based on a mobile terminal, the clipboard processing module further includes:

A first copy processing unit, configured to, if a copy content item is created when the clipboard is empty, obtain the creating time of the copy content item, and set a timeout time for a timer to be a clearing time, and then start the timer. Specifically as described above.

A second copy processing unit, configured to, when the earliest saved copy content item in the clipboard is deleted, turn off the timer if the clipboard is empty after the deletion; or, obtain the creating time of the earliest saved copy content item in the clipboard if the clipboard is not empty after the deletion, and set the timeout time of the timer as the clearing time, and then restart the timer. Specifically as described above.

A third copy processing unit, configured to, when the timer expires, delete the earliest saved copy content item in the clipboard, turn off the timer if the clipboard is empty after the deletion; or, obtain the creating time of the earliest saved copy content item in the clipboard if the clipboard is not empty after the deletion, and set the timeout time of the timer as the clearing time, and then restart the timer. Specifically as described above.

In the clipboard control system based on a mobile terminal, the paste processing module includes:

A display processing unit, configured to, when the user paste operation is detected, display all the copy content items in the clipboard according to the creating time of the items. Specifically as described above.

In summary, comparing the clipboard control method and clipboard control system based on a mobile terminal provided by the present application with the prior art, the method of the present application processes the contents of the clipboard by presetting a clipboard to control the time management of copy content items. Multiple pieces of copy contents can be saved in the clipboard. Therefore, there is no need to switch back and forth between the interfaces when continuously copying multiple pieces of contents, which is convenient for users to use, improves the operation efficiency for the user, and provides convenience for the users.

Certainly, those skilled in the art can understand that all or part of the processes in the foregoing embodiments can be implemented by instructing related hardware (such as a processor, a controller, etc.) in a computer program. The program can be stored in one readable storage medium of the computer, when execute, the program may include the processes of the various method embodiments as described above. The storage medium described therein may be a memory, a magnetic disk, an optical disk, or the like.

It could be understood that, one skilled in the art may make any equivalence or modification based on the technical solution and the inventive concept of the present disclosure. All these modifications and equivalences shall all be covered within the protection claimed in the claims of the present disclosure.

What is claimed is:

1. A clipboard control method based on a mobile terminal, comprising:
   (A) setting a clipboard, comprising: setting an allowable maximum number of copy content items in the clipboard and a clearing time, the clearing time being a survival time of one item of copy content in the clipboard; and setting the clipboard to be able to save multiple pieces of copy contents at the same time;
   (B) receiving an operation instruction from a user to copy the multiple pieces of the copy contents, processing the multiple pieces of the copy contents in the clipboard, and saving the multiple pieces of the copy contents in the clipboard when the multiple pieces of the copy contents need to be copied; and
   (C) receiving an operation instruction from the user to select a paste function when needing to paste, displaying all the copy content items in the clipboard based on creating time of the copy content items according to the selected paste function, selecting and pasting a specified copy content as needed;
   wherein in the block (B) processing the multiple pieces of the copy contents in the clipboard comprises:
   (B31) when the clipboard is empty and when a copy content item is created, obtaining the creating time of the copy content item, and setting a timeout time of a timer as the clearing time, and then starting the timer;
   (B32) when an earliest saved copy content item in the clipboard is deleted, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer; and
   (B33) when the timer expires, deleting the earliest saved copy content item in the clipboard, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer.

2. The clipboard control method based on a mobile terminal according to claim 1, wherein the block (B) comprises:
   (B1) when a user copy operation is detected, deleting an earliest saved copy content item when the copy content items existed in the clipboard reach the maximum number of the copy content items, and creating a copy content item in the clipboard for the copy operation;
   wherein the copy content item comprises a creating time of the copy content item, and the copy content;
   the creating time of the copy content item is a time when the copy content item is created; and
   the copy content is a content copied from the copy operation.

3. The clipboard control method based on a mobile terminal according to claim 1, wherein the block (B) comprises:
   when a storing time of a copy content item in the clipboard exceeds the clearing time, deleting the copy content item.

4. A clipboard control method based on a mobile terminal, comprising:
   (A) setting a clipboard, comprising setting an allowable number of copy content items in the clipboard and a survival time of a copy content corresponding to each of the copy content items in the clipboard, and setting the clipboard to be able to save multiple pieces of copy contents at the same time;
   (B) receiving an operation instruction from a user to copy the multiple pieces of the copy contents, processing the multiple pieces of the copy contents in the clipboard, and saving the multiple pieces of the copy contents in the clipboard when the multiple pieces of the copy contents need to be copied; and
   (C) receiving an operation instruction from the user to select a paste function when needing to paste, displaying the multiple pieces of the copy contents sequentially according to the selected pasting function, selecting and pasting a specified copy content as needed;
   wherein in the block (B) processing the multiple pieces of the copy contents in the clipboard comprises:
   (B31) when the clipboard is empty and when a copy content item is created, obtaining the creating time of the copy content item, and setting a timeout time of a timer as the survival time, and then starting the timer;
   (B32) when an earliest saved copy content item in the clipboard is deleted, turning off the timer when the clipboard is empty after the deletion; or, obtaining the creating time of the earliest saved copy content item in the clipboard when the clipboard is not empty after the deletion, and setting the timeout time of the timer as the clearing time, and then restarting the timer; and
   (B33) when the timer expires, deleting the earliest saved copy content item in the clipboard, turning off the timer when the clipboard is empty after the deletion; or, obtaining the creating time of the earliest saved copy content item in the clipboard when the clipboard is not empty after the deletion, and setting the timeout time of the timer as the survival time, and then restarting the timer.

5. The clipboard control method based on a mobile terminal according to claim 4, wherein the allowable number of the copy content items is a maximum number of the copy content items, and the maximum number of the copy content items is an upper limit of numbers of the copy content items in the clipboard; and the survival time of the copy content corresponding to each of the copy content items in the clipboard is a clearing time.

6. The clipboard control method based on a mobile terminal according to claim 5, wherein the block (B) comprises:
   when a storing time of a copy content item in the clipboard exceeds the clearing time, deleting the copy content item.

7. The clipboard control method based on a mobile terminal according to claim 4, wherein the block (B) comprises:
   (B1) when the user copy operation is detected, deleting an earliest saved copy content item when the copy content items existed in the clipboard reach a maximum number of the copy content items, and creating a copy content item in the clipboard for the copy operation;
   wherein the copy content item comprises a creating time of the copy content item, and an item content;
   the creating time of the copy content item is a time when the copy content item is created; and the item content is a content copied from the copy operation.

8. The clipboard control method based on a mobile terminal according to claim 4, wherein in the block (C) comprises:
(C1) when the user paste operation is detected, displaying the copy content items in the clipboard according to the creating time of the copy content items.

9. A clipboard control system based on a mobile terminal, comprising a processor and a memory, wherein the memory is configured to store computer instructions, the processor executes the computer instructions and is configured to:
set up a clipboard for setting an allowable number of copy content items in the clipboard and a survival time corresponding to each copy content in the clipboard; wherein the clipboard is set to be able to save multiple pieces of copy contents;
receive an operation instruction from a user for copying the multiple pieces of the copy contents, process the multiple pieces of the copy contents in the clipboard, and save the multiple pieces of the copy contents in the clipboard when the multiple pieces of the copy contents need to be copied; and
receive the user operation instruction for selecting a paste function when the pasting is needed, display the multiple pieces of the copy contents sequentially according to the selected paste function, and select and paste a specified copy content as needed;
wherein the processor is further configured to:
when the clipboard is empty and when a copy content item is created, obtain the creating time of the copy content item, and set a timeout time of a timer as the survival time, and then start the timer;
when an earliest saved copy content item in the clipboard is deleted, turn off the timer when the clipboard is empty after the deletion; or, obtain the creating time of the earliest saved copy content item in the clipboard when the clipboard is not empty after the deletion, and set the timeout time of the timer as the survival time, and then restart the timer; and
when the timer expires, delete the earliest saved copy content item in the clipboard, turn off the timer when the clipboard is empty after the deletion; or, obtain the creating time of the earliest saved copy content item in the clipboard when the clipboard is not empty after the deletion, and set the timeout time of the timer as the survival time, and then restart the timer.

10. The clipboard control system based on a mobile terminal according to claim 9, wherein the setting of the clipboard comprises setting a maximum number of copy content items and a clearing time, the maximum number of the copy content items is an upper limit of numbers of the copy content items in the clipboard, and the clearing time is a survival time of one copy content item in the clipboard.

11. The clipboard control system based on a mobile terminal according to claim 9, wherein the processor is further configured to:
when a user copy operation is detected, delete an earliest saved copy content item when the copy content items existed in the clipboard reach a maximum number of the copy content items, and create a copy content item in the clipboard for the copy operation;
wherein the copy content item comprises a creating time of the copy content item, and an item content;
the creating time of the copy content item is a time when the copy content item is created; and
the item content is a content copied from the copy operation.

12. The clipboard control system based on a mobile terminal according to claim 9, wherein the processor is further configured to:
when the user paste operation is detected, display all the copy content items in the clipboard according to the creating time of the copy content items.

\* \* \* \* \*